UNITED STATES PATENT OFFICE.

JOHN A. HUNTER, OF PHILADELPHIA, ASSIGNOR TO THE HUNTER STEEL COMPANY, OF CATASAUQUA, PENNSYLVANIA.

PROCESS OF INCREASING PERCENTAGE OF STEEL IN LOW-CARBON STEEL.

SPECIFICATION forming part of Letters Patent No. 498,063, dated May 23, 1893.

Application filed February 29, 1892. Renewed October 27, 1892. Serial No. 450,139. (No specimens.)

*To all whom it may concern:*

Be it known that I, JOHN A. HUNTER, a citizen of the United States, and a resident of Philadelphia, Pennsylvania, have invented certain Improvements in Processes of Increasing Percentage of Carbon in Low-Carbon Steel, of which the following is a specification.

The object of my invention is to increase the percentage of carbon in wrought iron or low steel and thereby convert the same into steel of high quality capable of being tempered, and available for use in the manufacture of cutting tools and for other purposes where such high carbon steel is required.

The main feature of the invention consists in subjecting the metal, while heated, to the action of a gas containing chlorine and oxygen and, by preference, also hydrogen, which gas is generated either in the presence of heated carbon or brought into contact with such heated carbon before or during its action upon the metal. The metal may be treated in the form of bars, ingots, billets or the like, and while heated to redness, or even to a white heat in a closed crucible or retort in which the gas is generated or into which said gas may be led from any outside generator, said crucible or retort also containing carbon, or carbon being present in the vessel in which the gas is generated or being placed in the path of the gas in its passage from the generator to the treating vessel.

In practice I have obtained good results by introducing muriatic acid, commercial chloride of lime which is a mixture of hypochlorite and basic chloride or oxychloride of lime or bleaching powder, salt and carbon, such as wood charcoal, into the crucible or retort in which the metal is to be treated and then closing the retort and subjecting it to heat so that hypochlorous acid (HClO) is generated during the treatment and is brought into contact with the heated carbon, as well as with the heated metal. The chlorine, oxygen and hydrogen, which compose the hypochlorous acid, are disunited by contact with the heated carbon or carbon and iron, and the oxygen and hydrogen take up carbon from the charge and carry it into the iron, the operation being facilitated by the presence of the chlorine. The effect of this treatment I find to be that the low steel or other metal low in carbon has a material addition of carbon. For instance, one analysis of metal before and after treatment shows that while the untreated metal contained of combined and graphitic carbon 0.320 per cent., the treated metal contained of combined and graphitic carbon 1.095 per cent.

In carrying out the invention the duration of the treatment will depend in a great measure upon the character of the metal to be treated and the proportions of the ingredients in the charge may also be varied without departing from my invention. I may say, however, that I have, in practice, obtained good results by a charge having for every hundred pounds of metal, about twenty-five ounces of muriatic acid, sixteen ounces of salt, thirty-two ounces of chloride of lime, and thirty-two ounces of carbon, the treatment continuing about one hour after the metal has been raised to the proper heat. Salt may in some cases be omitted, although its use is preferred.

When the chemical charge is heated in a vessel independent of the retort or crucible in which the treatment of the iron or steel takes place, the gases evolved should not be subjected to any washing, purifying or refining treatment before they are introduced into the crucible in which the treatment is effected.

Having thus described my invention, I claim and desire to secure by Letters Patent—

1. The mode herein described of increasing the percentage of carbon in low steel or like metal low in carbon, said mode consisting in subjecting said metal, while heated to redness in a crucible or retort, to the action of chlorine and oxygen which have first been brought into contact with heated carbon, substantially as specified.

2. The mode herein described of increasing the percentage of carbon in low steel or like metal low in carbon, said mode consisting in subjecting the metal to the action of chlorine and oxygen while said metal is heated to redness, and is contained with heated carbon in a crucible or retort, substantially as specified.

3. The mode herein described of increasing the percentage of carbon in low steel or like metal low in carbon, said mode consisting in subjecting said metal, while heated to redness in a crucible or retort, to the action of chlorine, oxygen and hydrogen which have first been brought into contact with heated carbon, substantially as specified.

4. The mode herein described of increasing the percentage of carbon in low steel or like metal low in carbon, said mode consisting in subjecting the metal, while heated to redness in a crucible or retort, to the action of the gases resulting from the heating together of muriatic acid, chloride of lime and carbon, substantially as specified.

5. The mode herein described of increasing the percentage of carbon in low steel or like metal low in carbon, said mode consisting in subjecting the metal, while heated to redness in a crucible or retort, to the action of gases arising from the heating together of muriatic acid, chloride of lime, salt and carbon, substantially as specified.

In testimony whereof I have signed my name to this specification in the presence of two subscribing witnesses.

JNO. A. HUNTER.

Witnesses:
EUGENE ELTERICH,
HARRY SMITH.